US011164081B2

(12) United States Patent
Pham et al.

(10) Patent No.: US 11,164,081 B2
(45) Date of Patent: Nov. 2, 2021

(54) SYNTHESIZING A SINGULAR ENSEMBLE MACHINE LEARNING MODEL FROM AN ENSEMBLE OF MODELS

(71) Applicant: Capital One Services, LLC, McLean, VA (US)

(72) Inventors: Vincent Pham, Champaign, IL (US); Mark Watson, Urbana, IL (US); Jeremy Goodsitt, Champaign, IL (US); Reza Farivar, Champaign, IL (US); Austin Walters, Savoy, IL (US); Kenneth Taylor, Champaign, IL (US); Fardin Abdi Taghi Abad, Champaign, IL (US); Anh Truong, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 147 days.

(21) Appl. No.: 16/162,639

(22) Filed: Oct. 17, 2018

(65) Prior Publication Data
US 2020/0125942 A1  Apr. 23, 2020

(51) Int. Cl.
*G06N 3/08* (2006.01)
*G06N 3/04* (2006.01)

(52) U.S. Cl.
CPC ........... *G06N 3/08* (2013.01); *G06N 3/04* (2013.01); *G06N 3/0427* (2013.01); *G06N 3/0445* (2013.01); *G06N 3/0454* (2013.01)

(58) Field of Classification Search
CPC .......... G06N 3/08; G06N 3/04; G06N 3/0427; G06N 3/0445; G06N 3/0454
See application file for complete search history.

(56) References Cited

U.S. PATENT DOCUMENTS

| 9,665,628 B1 * | 5/2017 | Dubey ............... G06F 16/22 |
| 2020/0117580 A1 * | 4/2020 | Lekivetz ........... G06F 11/3684 |
| 2020/0210847 A1 * | 7/2020 | Andoni ................ G06N 3/084 |

OTHER PUBLICATIONS

Hinton et al. "Distilling the Knowledge in a Neural Network", Mar. 9, 2015, NIPS 2014 Deep Learning Workshop, pp. 1-9 (Year: 2015).*
Helmy et al., "Non-linear Heterogeneous Ensemble Model for Permeability Prediction of Oil Reservoirs", Mar. 2, 2013, Arab J Sci Eng., pp. 1379-1395 (Year: 2013).*
Zhao et al., "Design of ensemble neural network using the Akaike information criterion", Dec. 2008, Engineering Applications of Artificial Intelligence 21, pp. 1182-1188 (Year: 2008).*
Nguyen et al., "Stopping criteria for ensemble of evolutionary artificial neural networks", Nov. 2005, Applied Soft Computing, vol. 6, Issue 1, pp. 100-107 (Year: 2005).*

\* cited by examiner

*Primary Examiner* — Alan Chen
*Assistant Examiner* — Brent Johnston Hoover
(74) *Attorney, Agent, or Firm* — Finnegan, Henderson, Farabow, Garrett & Dunner, LLP

(57) ABSTRACT

The present disclosure relates to systems and methods for generating and using a singular ensemble model.

20 Claims, 7 Drawing Sheets

SYNTHESIZING A SINGULAR ENSEMBLE MACHINE LEARNING MODEL FROM AN ENSEMBLE OF MODELS

TECHNICAL FIELD

The present disclosure relates generally to the field of machine learning algorithms. More specifically, and without limitation, this disclosure relates to systems and methods for generating singular ensemble machine learning models.

BACKGROUND

Machine learning models, such as linear regression, neural networks, and the like have become more prevalent for predictive modeling in recent years. Some uses of predictive modeling, such as providing suggested inputs to a user of a smartphone, a tablet, or the like, are more efficient if the machine learning model is executed directly on the user device rather than on a remote server. However, individual machine learning models suffer from inaccuracies. Accordingly, some predictive systems use models that are ensembles of individual models.

Such known techniques for ensemble modeling suffer from multiple drawbacks, however. For example, such ensemble models require increased processing power and memory resources, leaving them unsuitable for execution directly on the user device. Moreover, such ensemble models may require a combination of results from disparate model types (e.g., combining output of a neural network and output of a linear regression). This may require different combinatory functions because each model type may produce different output (e.g., a single prediction, a plurality of predictions with corresponding confidence levels, or the like).

A need, therefore, exists for systems and methods providing ensemble models with greater efficiency than extant ensemble models. Moreover, a need exists for systems and models providing ensemble models that handle input models of different types. The disclosed systems and methods provide technological solutions to at least these existing problems.

SUMMARY

Embodiments of the present disclosure provide for singular ensemble models. An ensemble model, as disclosed herein, represents a singular model rather than a combinatory function applied to the outputs of a plurality of models. In this manner, the disclosed embodiments can provide a marked improvement over inefficient extant processes, as well as handle ensembles of a plurality of different model types.

In one embodiment, a system for generating a singular ensemble model may comprise at least one processor and at least one storage medium storing instructions that, when executed, configure the processor to perform operations. The operations may comprise obtaining a plurality of machine learning models; obtaining a training data set; applying the plurality of machine learning models to the training data set to obtain outputs associated with the models; mapping the outputs to features of the models; combining the mapped features of the models into a singular machine learning model; training the singular machine learning model using the training data set; and outputting the trained singular machine learning model.

In one embodiment, a system for generating a singular ensemble model may comprise at least one processor and at least one storage medium storing instructions that, when executed, configure the processor to perform operations. The operations may comprise obtaining a plurality of machine learning models; obtaining a plurality of training data sets, each set corresponding to one of the machine learning models; applying the plurality of machine learning models to the corresponding training data sets to obtain output sets associated with the models, each output set corresponding to one of the machine learning models; combining the output sets to form a final output set; mapping the final output set to features of the models; combining the mapped features of the models into a singular machine learning model; training the singular machine learning model using the corresponding training data sets; and outputting the trained singular machine learning model.

In one embodiment, a system for generating a singular ensemble model may comprise at least one processor and at least one storage medium storing instructions that, when executed, configure the processor to perform operations. The operations may comprise obtaining a plurality of machine learning models; obtaining a training data set; applying the plurality of machine learning models to the training data set to obtain outputs associated with the models; mapping the outputs to features of the models; combining the mapped features of the models into a singular machine learning model; applying the singular machine learning model to the training data set to obtain output; comparing the outputs to the output of the singular machine learning model; adjusting one or more parameters of the singular machine learning model based on the comparison; and outputting the trained singular machine learning model.

In one embodiment, a system for applying a singular ensemble model may comprise at least one processor and at least one storage medium storing instructions that, when executed, configure the processor to perform operations. The operations may comprise obtaining, from a remote server, a data structure defining a singular ensemble machine learning model; obtaining, from the remote server, a data structure defining parameters of the singular ensemble model; storing the data structure defining the model and the data structure defining the parameters such that the singular ensemble machine learning model is executable locally on the system without resort to the remote server; obtaining input from a user of the system; and applying the singular ensemble machine learning model locally to the input to produce output for the user. The singular ensemble machine learning model may be generated as disclosed herein.

In one embodiment, a system for applying a singular ensemble model may comprise at least one processor and at least one storage medium storing instructions that, when executed, configure the processor to perform operations. The operations may comprise obtaining, from a remote server, a data structure defining a singular ensemble machine learning model; obtaining, from the remote server, a data structure defining parameters of the singular ensemble model; storing the data structure defining the model and the data structure defining the parameters such that the singular ensemble machine learning model is executable locally on the system without resort to the remote server; obtaining partial input from a user of the system; and applying the singular ensemble machine learning model locally to the partial input to produce recommendations of full input; and displaying one or more of the recommendations to the user. The singular ensemble machine learning model may be generated as disclosed herein.

In one embodiment, a system for applying a singular ensemble model may comprise at least one processor and at least one storage medium storing instructions that, when executed, configure the processor to perform operations. The operations may comprise obtaining, from a remote server, a data structure defining a singular ensemble machine learning model; obtaining, from the remote server, a data structure defining parameters of the singular ensemble model; storing the data structure defining the model and the data structure defining the parameters such that the singular ensemble machine learning model is executable locally on the system without resort to the remote server; obtaining input from a user of the system; and applying the singular ensemble machine learning model locally to the input to produce recommendations of further input; and displaying one or more of the recommendations to the user. The singular ensemble machine learning model may be generated as disclosed herein.

Additional embodiments of the present disclosure include non-transitory computer-readable media storing instructions that cause one or more processors to execute any of the methods disclosed herein.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the disclosed embodiments.

BRIEF DESCRIPTION OF THE DRAWINGS

The accompanying drawings, which comprise a part of this specification, illustrate several embodiments and, together with the description, serve to explain the disclosed principles. In the drawings.

DETAILED DESCRIPTION

The disclosed embodiments relate to systems and methods for generating and deploying singular ensemble machine learning models. Reference will now be made in detail to exemplary embodiments and aspects of the present disclosure, examples of which are illustrated in the accompanying drawings. While numerous specific details are set forth in order to provide a thorough understanding of the disclosed example embodiments, it would be understood by those skilled in the art that the principles of the example embodiments may be practiced without every specific detail. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently. Reference will now be made in detail to the disclosed embodiments, examples of which are illustrated in the accompanying drawings.

As used herein, the term "model" or "machine learning model" may connote any classifier, decision tree, neural network, or other algorithm with one or more parameters (e.g., weights, activation functions, or the like) that are adjusted to align the model such that training input produces desired output.

Figure 1:
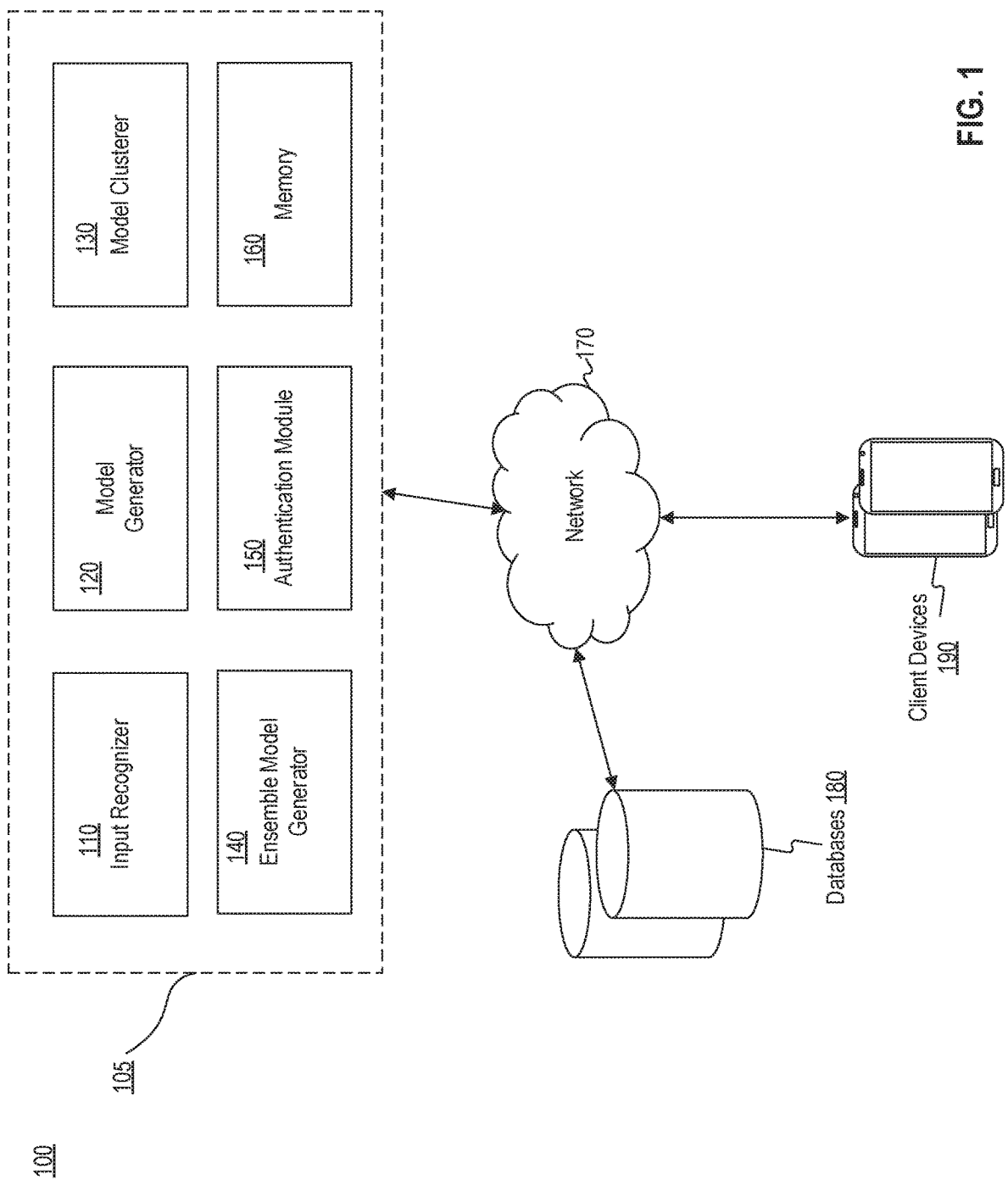
FIG. 1 is a block diagram of an exemplary system for training and deploying singular ensemble machine learning models, in accordance with disclosed embodiments.

FIG. 1 is a block diagram of an exemplary system 100. System 100 may be used to generate and apply singular ensemble machine learning models, in accordance with disclosed embodiments. System 100 may include a server system 105, which may include an input recognizer 110, a model generator 120, a model clusterer 130, an ensemble model generator 140, an authentication module 150, and a memory 160. System 100 may additionally include database(s) 180 and/or client device(s) 190. In some embodiments, as shown in FIG. 1, each component of system 100 may be connected to a network 170. However, in other embodiments components of system 100 may be connected directly with each other, without network 170.

Client device(s) 190 (also referred to as "user devices") may include one or more computing devices configured to perform operations consistent with disclosed embodiments. For example, client device 190 may include at least one of a desktop computer, a laptop, a server, a mobile device (e.g., tablet, smart phone, etc.), a gaming device, a wearable computing device, or other type of computing device. Client device 190 may include one or more processors configured to execute software instructions stored in memory, such as memory included in client device 190. Client device 190 may further include software that, when executed by a processor, applies one or more machine learning models to input from a user. For instance, client device 190 may execute software that generates and displays recommendations determined using one or more machine learning models on a display device included in, or connected to, client device 190. Client device 190 may further execute applications that allow client device 190 to communicate with components over network 170.

The disclosed embodiments are not limited to any particular configuration of client device 190. For instance, client device 190 may comprise a mobile device that stores and executes mobile applications that interact with server system 105 to perform aspects of the disclosed embodiments, such as receiving trained singular ensemble models from server system 105 for local execution on client device 190. In certain embodiments, client device 190 may be configured to receive input from a user, e.g., using an input device (such as a keyboard, touchscreen, or the like), from a location service (such as a GPS locator), and/or from one or more additional sensors (such as an image sensor capturing video and/or images, an audio sensor capturing audio, or the like).

Database(s) 180 may include one or more computing devices configured to provide training data to one or more of server system 105, input recognizer 110, model generator 120, and ensemble model generator 140. In some aspects, such training data may include stored information such as historical inputs from users, historical transactional data, historical fraud data, or the like. Database(s) 180 may include, for example, one or more Oracle™ databases, Sybase™ databases, or other relational databases or non-relational databases, such as Hadoop™ sequence files, HBase™, or Cassandra™. Database(s) 180 may include computing components (e.g., database management system, database server, etc.) configured to receive and process requests for data stored in memory devices of the database(s) and to provide data from the database(s).

Although database(s) 180 is shown separately, in some embodiments database 180 may be included in or otherwise related to one or more of server system 105, input recognizer 110, model generator 120, and ensemble model generator 140.

Model clusterer 130 may include one or more computing systems configured to collect models applied to the same or similar (e.g., same data type, same type of prediction, or the like) machine learning models. Model clusterer 130 may be configured to select training data sets consistent with the clustered models. Consistent with disclosed embodiments, these training data sets may be used to develop an ensemble model. For example, model clusterer 130 may collect training sets for use in training an ensemble model comprising a linear regression classifier, a convolutional neural network, or the like, or any combination thereof.

Model generator 120 may include one or more computing systems configured to generate models for clustering by model clusterer 130. Model generator 120 may, for example, be configured to receive or obtain information from database(s) 180, client device(s) 190, and/or input recognizer 110. For example, model generator 120 may receive a plurality of user inputs stored in database(s) 180 and/or retrieved from client device(s) 190, a plurality of transactions stored in database(s) 180 and/or retrieved from client device(s) 190, or the like.

In some embodiments, model generator 120 may receive requests from input recognizer 110. For example, input recognizer 110 may request a model in response to input from client device(s) 190 and/or from a user of server system 105. As a response to such a request, model generator 120 may generate one or more models consistent with, for example, a requested prediction included in the input. In some aspects, the generated model(s) may include one or more linear regressions, neural networks, or the like that predict validity of a transaction (and/or possibility of fraud) based on features extracted from the transaction. In other aspects, the model(s) may include one or more linear regressions, neural networks, or the like that predict input of a user based on features extracted from partial inputs (e.g., recommending "Capital One" in response to "Cap").

In any of the embodiments described above, the model(s) may include statistical algorithms. For example, the model(s) may include regression models that estimate the relationships among input and output variables. In some aspects, the model(s) may additionally or alternatively sort elements of a dataset using one or more classifiers to determine the probability of a specific outcome. The model(s) may be parametric, non-parametric, and/or semi-parametric.

In some embodiments, the model(s) may include a convolutional neural network model. The convolutional neural network may comprise an input layer, one or more middle layers, and one or more output layers. In some embodiments, the input layer may comprise multiple matrices (e.g., a matrix for pixel values in an image, a matrix for characters in an input string, or the like). Alternatively, the input layer may comprise a single matrix (e.g., a single matrix of pixel brightness values, a single matrix of character distributions, or the like). In some aspects, each middle layer and/or the output layer may be a deterministic function of the values of the preceding layer.

The convolutional neural network may include one or more convolutional layers. Each convolutional layer may be configured to convolve one or more spatial filters with the convolutional layer input to generate a convolutional layer output tensor. One or more spatial filter functions may be defined by a matrix of weights to be applied to the elements of the preceding layer during a convolution operation, an offset, and/or an activation function. Training the convolutional neural network may comprise modifying the weights and offsets using a backpropagation algorithm. In some embodiments, the convolutional neural network may also include pooling layers and/or fully connected layers.

Additionally or alternatively, the model(s) may include a deep fully connected neural network. The deep fully connected neural network may comprise an input layer, one or more middle layers, and one or more output layers. The middle layer(s) may each be fully connected. Accordingly, each middle layer may have a plurality of neurons (or nodes), each neuron being connected to every neuron of the previously layer.

Additionally or alternatively, the model(s) may include a recurrent neural network. The recurrent neural network may comprise an input layer, one or more middle layers, and one or more output layers. The middle layer(s) may include a plurality of neurons (or nodes) that use input from one or more neurons of a previous layer in combination with previous (in time) states and/or outputs of the neuron itself.

Although the above examples include neural networks, other embodiments may include additional or alternative models. For example, additionally or alternatively, the model(s) may include Random Forests, composed of a combination of decision tree predictors. Such decision trees may comprise a data structure mapping observations about an input, in the "branch" of the tree, to conclusions about a target value, in the "leaves" of the tree. Each tree may depend on the values of a random vector sampled independently and with the same distribution for all trees in the forest. Any other machine learned models may be applied in addition to or in lieu of a Random Forest model.

Model generator 120 may be configured to submit models to model clusterer 130 as explained above. Model clusterer 130 may cluster models by input and/or output (e.g., models that predict user input from partial input may be clustered together, models that classify images may be clustered together, models that predict validity and/or fraudulency of a transaction may be clustered together, or the like). Model generator 120 may communicate with server system 105 via network 170 or other communication avenues.

Input recognizer 110 may be configured to categorize input into training sets. For example, input recognizer 110 may cluster images as a possible training set for an image classifier, partial user inputs as a possible training set for a user input predictor, or the like. Additionally or alternatively, input recognizer 110 may receive a request to generate new models using model generator 120 and/or apply models generated by model generator 120. Input recognizer 110 may receive the requests from client device(s) 190 and/or from a user of server system 105.

FIG. 1 shows input recognizer 110, model generator 120, and model clusterer 130 as separate components. However, input recognizer 110, model generator 120, and/or model clusterer 130 may be implemented in the same computing system.

Ensemble model generator 140 may include one or more computing systems configured to perform operations consistent with generating a singular ensemble machine learning model, e.g., as described below with respect to method 500 of FIG. 5. The models input to ensemble model generator 140 may have been generated by model generator 120 and clustered by model clusterer 130. Additionally or alternatively, the models may be retrieved from database(s) 180.

Authentication module 150 may include one or more computing systems configured to perform one or more operations consistent with authenticating a user. In some embodiments, a user may register for an account and create authentication credentials, such as a user name and password. The user account information, including the authentication credentials, may be stored in memory 160, for example. To access the user account, a registered user may provide authentication information to the authentication module 150 via client device(s) 190. Authentication module 150 may be configured to authenticate the user based on the received authentication information (e.g., comparing the submitted user name and password information to the stored username and password credentials). Authentication module 150 may then grant access to the user account. In some embodiments, authentication module 150 may provide access to singular ensemble models generated by ensemble model generator 140.

Network 170 may be any type of network configured to provide communications between components of system 100. For example, network 170 may be any type of network (including infrastructure) that provides communications, exchanges information, and/or facilitates the exchange of information, such as the Internet, a Local Area Network, near field communication (NFC), optical code scanner, or other suitable connection(s) that enables the sending and receiving of information between the components of system 100. In some embodiments, one or more components of system 100 can communicate through network 170. In various embodiments, one or more components of system 100 may communicate directly through one or more dedicated communication links.

It is to be understood that the configuration and boundaries of the functional building blocks of system 100 have been defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
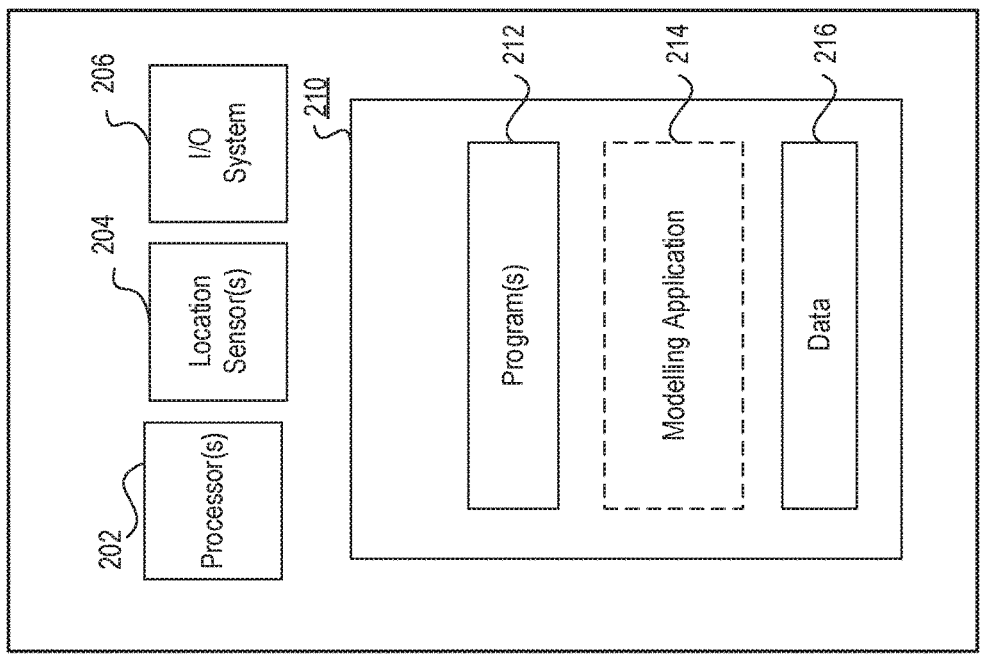
FIG. 2 is a block diagram of an exemplary user device, in accordance with disclosed embodiments.

FIG. 2 is a block diagram of client device 190, in accordance with disclosed embodiments. In one embodiment, client device 190 may include processor(s) 202, location sensor(s) 204, input/output (I/O) system 206, and memory 210. In some embodiments, client device 190 may take the form of a mobile computing device (e.g., a wearable device, smartphone, tablets, laptop, or similar device), a desktop (or workstation or similar device), or a server. Alternatively, client device 190 may be configured as a particular apparatus, embedded system, dedicated circuit, or the like based on the storage, execution, and/or implementation of the software instructions that perform one or more operations consistent with the disclosed embodiments.

Processor(s) 202 may include one or more known processing devices, such as mobile device microprocessors manufactured by Intel™, NVIDIA™, or various processors from other manufacturers. As would be appreciated by one of skill in the art, the disclosed embodiments are not limited to a particular processor type.

Memory 210 may include one or more storage devices configured to store instructions for performing operations related to disclosed embodiments. For example, memory 210 may be configured with one or more software instructions, such as program(s) 212, that when executed by processor(s) 202, may cause client device 190 to perform operations according to the disclosed embodiments. The disclosed embodiments are not limited to separate programs or computers configured to perform dedicated tasks. For example, client device 190 may be configured to perform the disclosed functions of client device 190 by one or more programs stored in memory 210 (e.g., program(s) 212). In some aspects, memory 210 may be configured to store data 216 used by one or more program(s) 212.

In certain embodiments, memory 210 may store a modelling application 214 that may be executed by processor(s) 202 to apply one or more machine learning models consistent with disclosed embodiments. In certain aspects, modelling application 214, or another software component, may be configured to receive a singular ensemble model from server system 105 for local application by modelling application 214 without resort to server system 105. Accordingly, the structure and parameters of the singular ensemble model may be stored on memory 210.

Location sensor(s) 204 may include sensor(s) and/or system(s) capable of determining a location of client device 190, such as a Global Positioning System (GPS) receiver, a Bluetooth transceiver, or a WiFi transceiver. When location sensor(s) 204 include multiple sensors and/or systems, client device 190 may be configured to determine geographic coordinates or identifiers, such as latitude or longitude based on data provided from the multiple sensors and/or systems. Client device 190 may be configured to send geographic coordinates or identifiers determined by location sensor(s) 204 to other components of system 100 via, for example, network 170.

I/O system 206 may include one or more devices configured to allow data to be received and/or transmitted by client device 190 and to allow client device 190 to communicate with other machines and devices, such as other components of system 100. For example, I/O system 206 may include a screen for providing information to the user. I/O system 206 may also include components for NFC communication. I/O system 206 may also include one or more digital and/or analog devices that allow a user to interact with client device 190 such as a touch-sensitive area, buttons, or microphones. I/O system 206 may also include one or more accelerometers to detect the orientation and/or inertia of client device 190. I/O system 206 may also include other components known in the art for interacting with server system 105.

The components of client device 190 may be implemented in hardware, software, or a combination of both hardware and software, as will be apparent to those skilled in the art.

Figure 3:
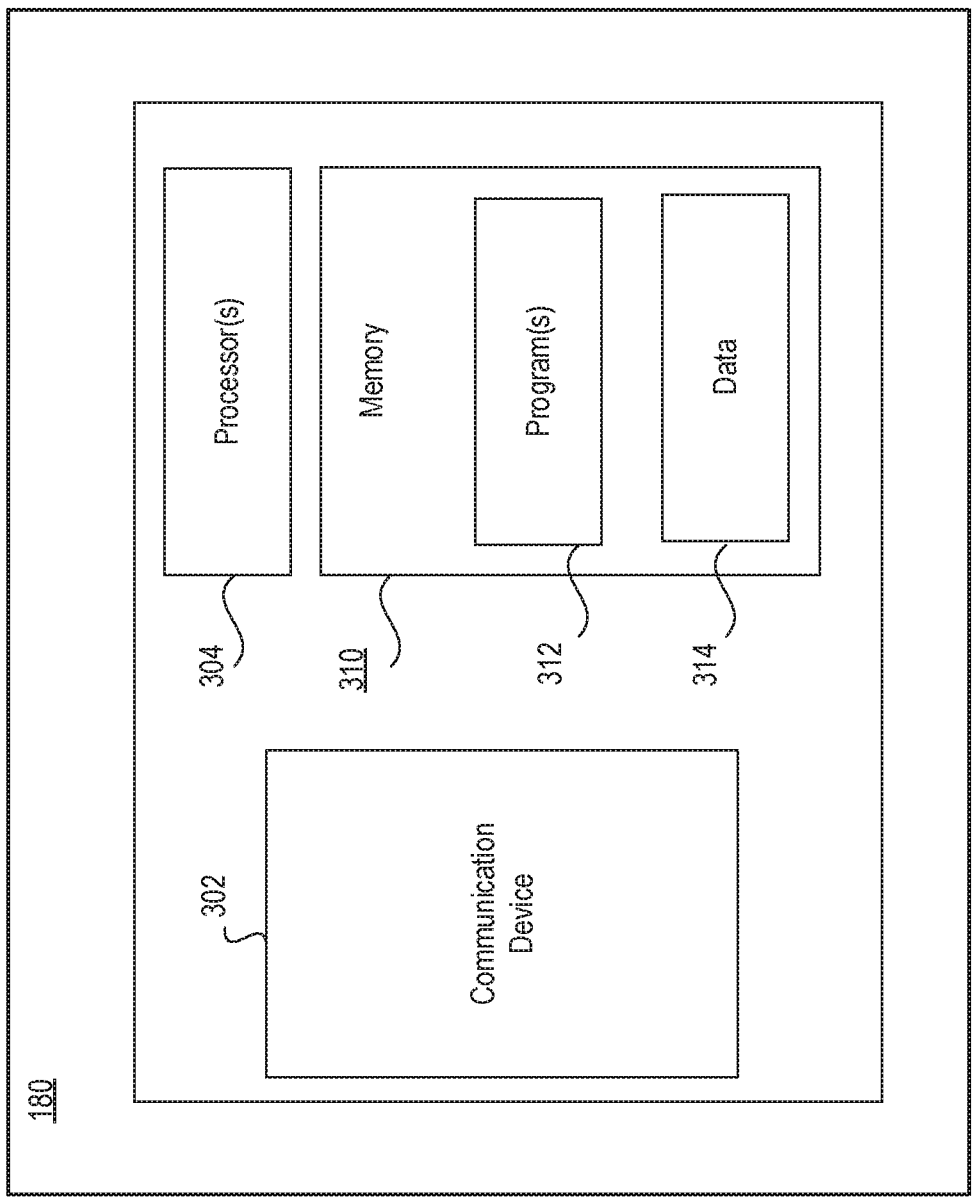
FIG. 3 is a block diagram of an exemplary server, consistent with embodiments of the present disclosure.

FIG. 3 is a block diagram of an exemplary database 180, in accordance with disclosed embodiments. Database 180 may include communication device 302, one or more database processor(s) 304, and database memory 310 including one or more database program(s) 312 and data 314. In some embodiments, database 180 may be hosted on one or more computing devices (e.g., desktops, workstations, servers, or computing clusters).

Communication device 302 may be configured to communicate with one or more components of system 100, such as server system 105, input recognizer 110, model generator 120, model clusterer 130, and/or client device(s) 190. In particular, communication device 302 may be configured to provide data sets to input recognizer 110 for clustering, data sets to model generator 120 for model generation, and/or stored models to model clusterer 130 for clustering.

The components of database 180 may be implemented in hardware, software, or a combination of both hardware and software, as will be apparent to those skilled in the art. For example, although one or more components of database 180 may be implemented as computer processing instruction modules, all or a portion of the functionality of database 180 may be implemented instead in dedicated electronics hardware.

Data 314 may comprise data sets for model training and/or stored models. As explained above, data 314 may comprise stored information such as historical inputs from users, historical transactional data, historical fraud data, or the like.

Figure 4:
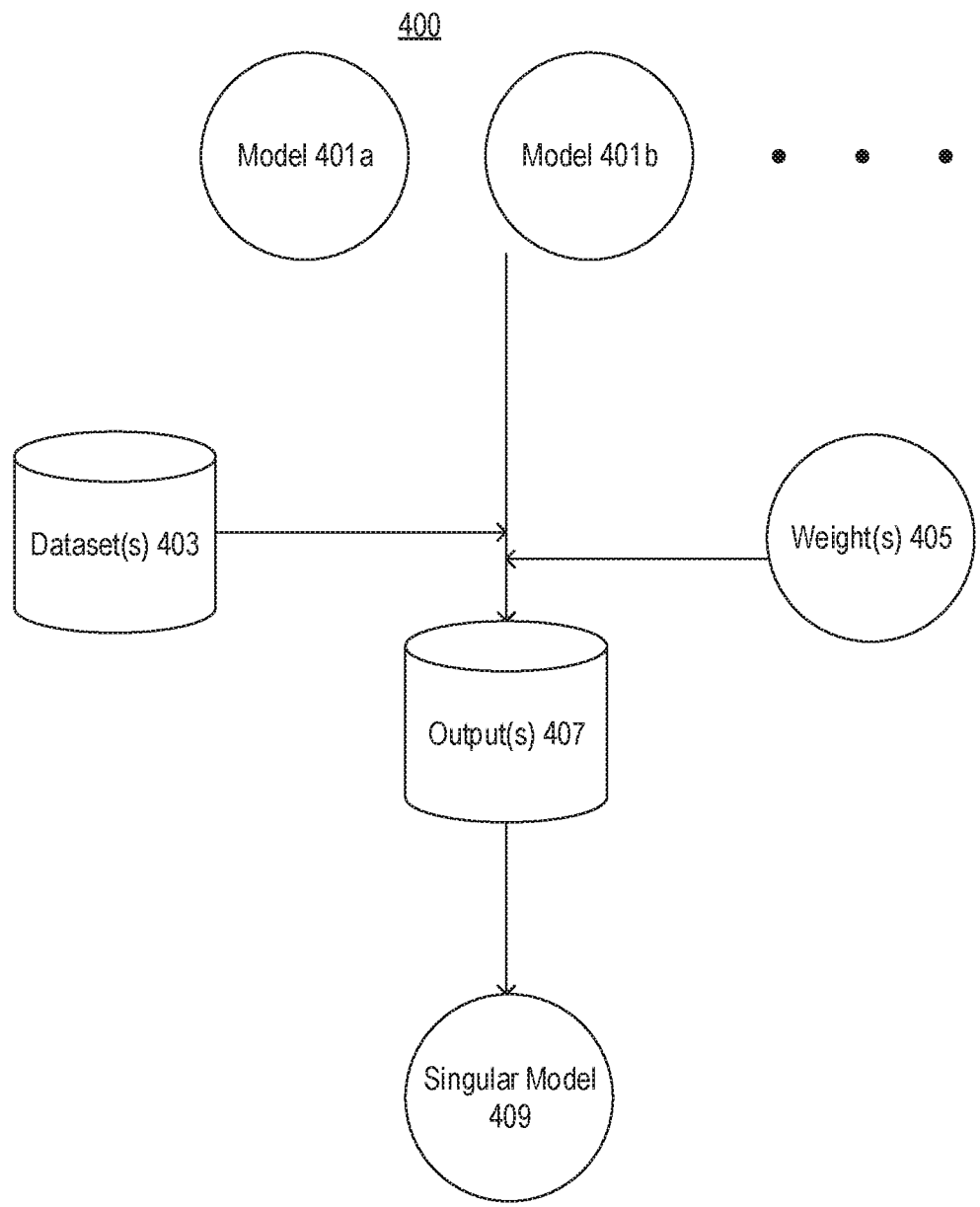
FIG. 4 is a block diagram of an exemplary process for training a singular ensemble machine learning model, consistent with embodiments of the present disclosure.

FIG. 4 depicts an exemplary process 400 for training a singular ensemble machine learning model. As depicted in FIG. 4, process 400 may use one or more existing models, e.g., model 401a, model 401b, or the like, in training a singular ensemble machine learning model. For example, the one or more existing models may include one or more classifiers, one or more decision tree models, one or more neural networks, or the like (e.g., applied to images or to text to generate classifications, applied to partial inputs or to transactions to generate predictions, or the like).

Dataset(s) 403 may comprise one or more stored datasets used to train or otherwise test the one or more existing models. Accordingly, dataset(s) 403 may comprise annotated sets. One or more of dataset(s) 403 may be associated with a particular model of the one or more existing models and/or may represent a standalone set of training and/or testing data independent of the training and testing of the one or more existing models. As depicted in FIG. 1, process 400 may apply the one or more existing models to dataset(s) 403 to generate output(s) 407. Accordingly, output(s) 407 may comprise sets of outputs, with different sets of outputs associated with different existing models.

Additionally or alternatively, the one or more existing models may first be combined (e.g., at an output layer or other output stage) into a conventional ensemble model. For example, a Bayes optimal classifier, bootstrap aggregation, Bayesian parameter averaging, or other combination of outputs of the one or more existing models may be used. As depicted in FIG. 4, weight(s) 405 may be applied in the ensemble model. Weight(s) 405 may be equal or may comprise, for example, values based on input of a user. Accordingly, output(s) 407 may comprise output of the ensemble model.

In any of the embodiments described above, output(s) 407 may be mapped to one or more features of the existing model(s). For example, the features may comprise one or more dimensions of feature vectors identified by the existing model(s) and may be identified using backpropagation of the existing model(s). Additionally or alternatively, the features may be identified based on the prevalence of the one or more dimensions in comparison with weight(s) 405.

Based on the mapping, singular model 409 may combine one or more features identified in the existing model(s). In some embodiments, the existing model(s) may all comprise the same type of model. Accordingly, singular model 409 may similarly comprise the same type. For example, if the existing model(s) are all decision trees, singular model 409 may comprise a decision tree (or a random forest collection of decision trees). In another example, if the existing model(s) are all Bayesian classifiers, singular model 409 may comprise a Bayesian classifier.

In other embodiments, the existing model(s) may comprise different models. Accordingly, singular model 409 may comprise a neural network. For example, if the existing models include a decision tree and a neural network, singular model 409 may comprise a neural network with nodes corresponding to the existing neural network and nodes corresponding to the decision tree. In another example, if the existing models include a decision tree and a Bayesian classifier, singular model 409 may comprise a neural network with nodes corresponding to the Bayesian classifier and nodes corresponding to the decision tree.

In order to develop such a singular model 409, embodiments of the present disclosure may apply one or more stored transformations. For example, a stored transformation may include a blueprint for converting a decision tree to an equivalent neural network structure, a blueprint for converting a Bayesian classifier to an equivalent neural network structure, or the like. Additionally or alternatively, a grid search may map hyperparameters of one or more models (e.g., a decision tree, a Bayesian classifier, or the like) to an equivalent neural network structure. In some embodiments, one or more hyperparameters may be added. For example, the LASSO algorithm may add a regularization hyperparameter to a model comprising an ordinary least squares regression such that the model is suitable for a grid search.

In any of the embodiments described above, singular model 409 may overfit the existing model(s). For example, if model 401a has an accuracy of 60%, and model 401b has an accuracy of 70%, singular model 409 may have a convergence threshold of at least 65%, which is the average. In other examples, singular model 409 may fit at least the median accuracy or other statistical combination of the accuracies of 401a, 401b, and the like.

In some embodiments, the structure of singular model 409 may depend, at least in part, on the structures of models 401a, 401b, and the like. For example, if singular model 409 comprises a neural network, singular model 409 may have at least as many layers as the existing model (or neural network transformation of said model) having the greatest number of layers. Similarly, each layer within singular model 409 may have at least as many nodes as a corresponding layer of one of the existing models (or a neural network transformation of said model) having the greatest number of nodes.

Singular model 409 may then be trained as described below with respect to methods 500 and/or 600.

Figure 5:
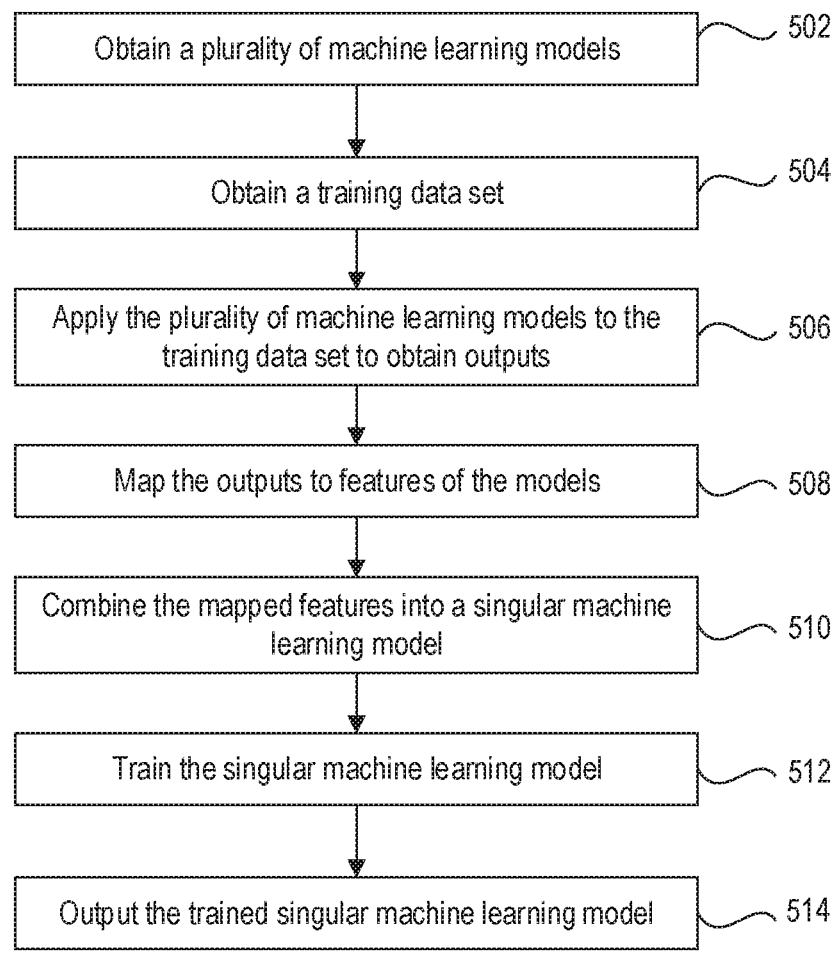
FIG. 5 is a flowchart of an exemplary method for generating a singular ensemble model, consistent with embodiments of the present disclosure.

FIG. 5 is a flowchart of an exemplary method 500 for generating a singular ensemble model, consistent with embodiments of the present disclosure. Method 500 may be performed using system 100. In some embodiments, one or more steps of method 500 may be performed by client device(s) 190. In various embodiments, one or more steps of method 500 may be performed by server system 105. In certain embodiments, method 500 may be performed entirely by server system 105 (or by client device(s) 190).

At step 502, system 105 may obtain a plurality of machine learning models. For example, as explained above with respect to FIG. 1, system 105 may obtain the plurality of models from database(s) 180 and/or from model generator 120. As further explained above with respect to FIG. 1, system 105 may obtain the plurality of models from a single cluster as determined by model clusterer 130.

In some embodiments, the plurality of machine learning models may include at least one neural network. Additionally or alternatively, the plurality of machine learning models may include at least one linear regression. The plurality of machine learning models may additionally or alternatively include other classifiers and/or other models such as decision trees or the like.

At step 504, system 105 may obtain a training data set. For example, as explained above with respect to FIG. 1, system 105 may obtain the training set from database(s) 180. As further explained above with respect to FIG. 1, system 105 may obtain the training set as a cluster of inputs from input recognizer 110.

In some embodiments, the training data set may comprise a plurality of training sets. For example, each set may correspond to one of the machine learning models. Additionally or alternatively, at least one of the sets may comprise a new set independent of the training and/or testing of the machine learning models. In any of these embodiments, the training data set(s) may be annotated. For example, the training data set(s) may be labeled with correct outputs and/or outputs with preferred probabilities (whether classifications, predictions, or the like).

At step 506, system 105 may apply the plurality of machine learning models to the training data set to obtain outputs associated with the models. For example, system 105 may apply each model to its corresponding training data set such that each output set corresponds to one of the models. In embodiments with new training set(s), system 105 may apply all or a subset of the models to the new training set(s). The output sets may include one or more outputs and may optionally include probabilities associated with each output.

At step 508, system 105 may map the outputs to features of the models. For example, as explained above with respect to FIG. 4, system 105 may use backpropagation to determine feature vectors identified by the models determinative, at least in part, of one or more of the outputs. In some embodiments, mapping the outputs to features of the models comprises applying one or more weights to the outputs during mapping. The weights may comprise equal weights and/or inputs from a user. Accordingly, system 105 may perform the mapping using, at least in part, the weights to identify feature vectors that are determinative.

Additionally or alternatively, system 105 may combine the output sets to form a final output set. For example, system 105 may combine the outputs after applying the models or, as explained above with respect to FIG. 4, may generate a conventional ensemble model that combines the output sets before applying the models. In either embodiment, system 105 may map the final output set to features of the models. For example, as explained above with respect to FIG. 4, system 105 may use backpropagation to determine feature vectors identified by the models determinative, at least in part, of one or more of the outputs. In some embodiments, mapping the outputs to features of the models comprises applying one or more weights to the outputs during mapping and/or during generation of the ensemble model. The weights may comprise equal weights and/or be based on inputs from a user. Accordingly, system 105 may perform the mapping using, at least in part, the weights to identify feature vectors that are determinative.

At step 510, system 105 may combine the mapped features of the models into a singular machine learning model. For example, as explained above with respect to FIG. 3, system 105 may generate a new model configured to overfit the mapped features from step 508. In some embodiments, system 105 may determine whether the plurality of machine learning models comprise the same type of model. When the models are determined to comprise the same type of model, system 105 may select a type for the singular machine learning model matching the same type as the models. When the models are determined to comprise different types of models, system 105 may select a neural network type model for the singular machine learning model. Accordingly, a cluster of classifiers may result in a singular machine learning model that is a classifier while a cluster of different models may result in a singular machine learning model that is a neural network.

In embodiments where the singular machine learning model comprises a neural network, the neural network may overfit the plurality of models, for example, by comprising a plurality of layers, wherein the plurality of layers is at least as many layers as comprise a model in the plurality of models that has a largest number of layers. Additionally, each layer of the singular machine learning model may comprise a plurality of nodes, wherein the plurality of nodes is at least as many nodes as comprise a corresponding layer of a model in the plurality of models that has a largest number of nodes.

At step 512, system 105 may train the singular machine learning model using the training data set. In embodiments having a plurality of training data sets, system 105 may train the singular machine learning model using the corresponding training data sets. In embodiments having at least one training data set not associated with the training and/or testing of the models, system 105 may train the singular machine learning model using at least one new training data set in addition to or in lieu of the one or more training sets associated with the models.

In some embodiments, training the singular machine learning model may comprise recursive adjustments of one or more parameters of the singular machine learning model, e.g., as explained with respect to method 600 of FIG. 6 below. For example, the recursive adjustments may be configured to reduce at least one of root-mean-square error (RMSE), Akaike information criterion (AIC), or logarithmic loss (LOGLOSS) of the singular machine learning model. Additionally or alternatively, the recursive adjustments may be configured to reduce one or more associated loss functions of the singular machine learning model. The loss function may comprise a combination of loss functions associated with the models.

At step 514, system 105 may output the trained singular machine learning model. For example, outputting the trained singular machine learning model may comprise at least one of storing the trained singular machine learning model in the at least one storage medium (e.g., database(s) 180) or transmitting the trained singular machine learning model to a user device (e.g., client device(s) 190).

Figure 6:
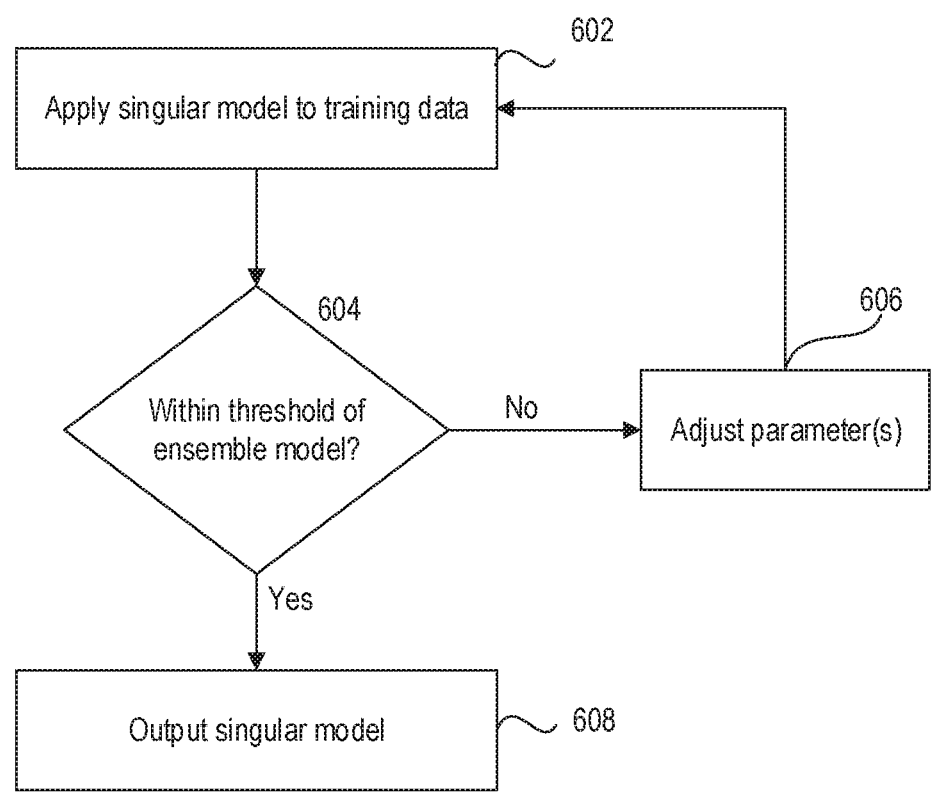
FIG. 6 is a flowchart of an exemplary method for converging parameters of a singular ensemble model, consistent with embodiments of the present disclosure.

FIG. 6 is a flowchart of an exemplary method 600 for converging parameters into a singular ensemble model, consistent with embodiments of the present disclosure. Method 600 may be performed using system 100. In some embodiments, one or more steps of method 600 may be performed by client device(s) 190. In various embodiments, one or more steps of method 600 may be performed by server system 105. In certain embodiments, method 600 may be performed entirely by server system 105 (or by client device(s) 190).

In some embodiments, method 600 may comprise a portion of step 512 of method 500 of FIG. 5. Accordingly, the system executing step 512 may comprise the system executing method 600.

At step 602, system 105 may apply a singular machine learning model (that is, the singular ensemble model) to a training data set to obtain output. For example, as explained above with respect to FIG. 1, system 105 may obtain the training data set from database(s) 180. As further explained above with respect to FIG. 1, system 105 may obtain the training data set as a cluster of inputs from input recognizer 110.

At step 604, system 105 may compare outputs of models used to generate the singular machine learning model to the output of the singular machine learning model. For example, system 105 may compare outputs directly or may use one or more measures of accuracy. The measures of accuracy may comprise a root-mean-square error (RMSE), Akaike information criterion (AIC), logarithmic loss (LOGLOSS), or the like; one or more associated loss functions; or any combination thereof. In any of these embodiments, system 105 may determine whether the direct comparison and/or the one or more measures comply with one or more thresholds. The thresholds may comprise direct thresholds or may comprise thresholds relative to the last iteration (e.g., system 105 determines convergence based on a less than 5% change, 2% change, 1% change, or the like as compared with the last one, two, three, or the like iterations).

If the parameters are not converged (step 604: No), system 105 may adjust one or more parameters of the singular machine learning model based on the comparison. For example, system 105 may adjust the one or more parameters to reduce differences (or the one or more measures of difference) between the outputs of the models and the output of the singular machine learning model. Then the process continues again with step 602, described above.

However, if the parameters are converged (step 604: yes), system 105 may output the trained singular machine learning model. For example, outputting the trained singular machine learning model may comprise at least one of storing the trained singular machine learning model in the at least one storage medium (e.g., database(s) 180) or transmitting the trained singular machine learning model to a user device (e.g., client device(s) 190).

Figure 7:
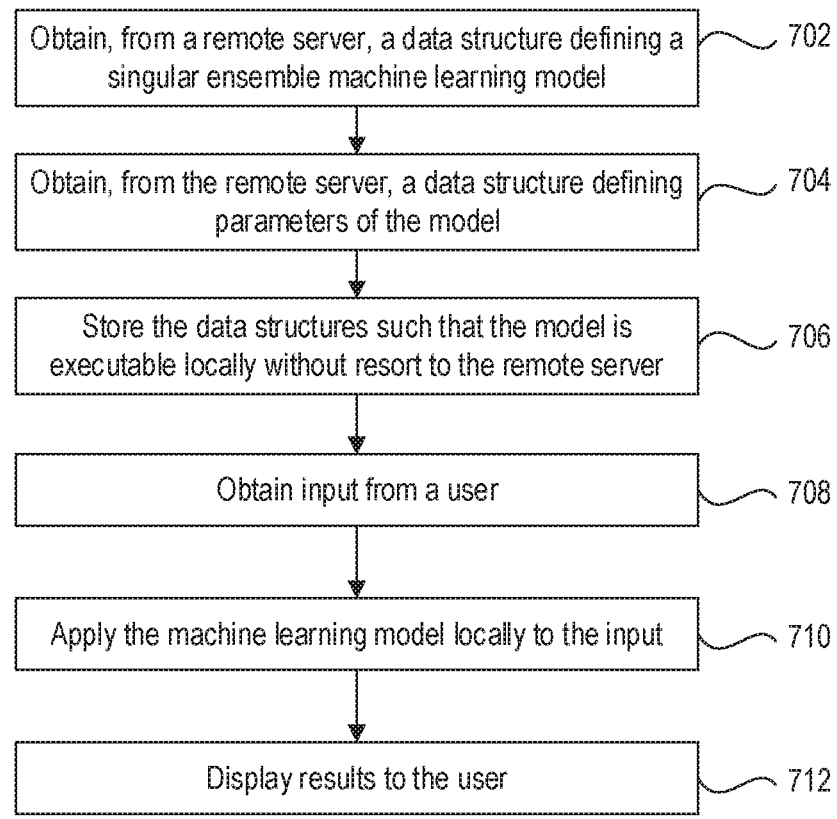
FIG. 7 is a flowchart of an exemplary method for applying a singular ensemble model, consistent with embodiments of the present disclosure.

FIG. 7 is a flowchart of an exemplary method 700 for applying a singular ensemble model, consistent with embodiments of the present disclosure. The singular ensemble machine learning model may be generated as disclosed above, e.g., with respect to method 600 of FIG. 6. Method 700 may be performed using system 100. In some embodiments, one or more steps of method 700 may be performed by client device(s) 190. In various embodiments, one or more steps of method 700 may be performed by server system 105. In certain embodiments, method 700 may be performed entirely by server system 105 (or by client device(s) 190).

At step 702, client device 109 may obtain, from a remote server (e.g., server system 105), a data structure defining a singular ensemble machine learning model. For example, the data structure may comprise a Tensorflow file or other file defining a structure (e.g., nodes and layers for a neural network, rules for a classifier, branches and leaves for a decision tree, or the like).

At step 704, client device 109 may obtain, from a remote server (e.g., server system 105), a data structure defining parameters of the singular ensemble model. For example, the data structure may comprise a log file, a relational data file, or other file having parameters configured for placement in the structure (e.g., weights and activation functions for a neural network, parameters of conditionals for a classifier, parameters of conditionals for a decision tree, or the like).

At step 706, client device 109 may store the data structure defining the model and the data structure defining the parameters such that the singular ensemble machine learning model is executable locally on the system without resort to the remote server. For example, client device 109 need not obtain the parameters again from the remote server and need not send input to the remote server to obtain predictions.

At step 708, client device 109 may obtain input from a user of the system. For example, as explained above, a keyboard, a touchscreen, or other input device of client device 109 may receive the input. Additionally or alternatively, client device 109 may retrieve inputs to the model from one or more storage media and/or from a remote storage (e.g., from the remote server) over one or more computer networks.

At step 710, client device 109 may apply the singular ensemble machine learning model locally to the input to produce output for the user. For example, client device 109 may predict full input based on partial input, may predict further input based on initial input, or may predict outcomes (e.g., weather, sporting events, transaction clearing probabilities, or the like) based on the input. Accordingly, at step 712, client device 109 may display the results to the user, e.g., as suggested input or as a response to the input.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented with hardware alone. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

Instructions or operational steps stored by a computer-readable medium may be in the form of computer programs, program modules, or codes. As described herein, computer programs, program modules, and code based on the written description of this specification, such as those used by the controller, are readily within the purview of a software developer. The computer programs, program modules, or code can be created using a variety of programming techniques. For example, they can be designed in or by means of Java, C, C++, assembly language, or any such programming languages. One or more of such programs, modules, or code can be integrated into a device system or existing communications software. The programs, modules, or code can also be implemented or replicated as firmware or circuit logic.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A system for generating a singular ensemble model, comprising:
    a model generator configured to:
        obtain information from at least one of a database, a client device, or an input recognizer; and
        generate a plurality of machine learning models based on the obtained information, the models having a plurality of layers, a plurality of nodes, and a model type;
    a model clusterer configured to:
        obtain the models from the model generator; and
        automatically generate clusters of the models, the clusters comprising a plurality of the models having at least one of a similar input type or a similar output type;
    at least one processor; and
    at least one storage medium storing instructions that, when executed, configure the processor to perform operations comprising:
        obtaining, from the model clusterer, a plurality of the clustered models;
        obtaining a training data set consistent with the clustered models from at least one of the database, the client device, or the input recognizer;
        applying the clustered models to the training data set to obtain outputs associated with the clustered models;
        mapping the outputs to features of the clustered models;
        combining the mapped features into a singular machine learning model;
        training the singular machine learning model using the training data set; and
        outputting the trained singular machine learning model, the outputting comprising transmitting the trained singular machine learning model to a client device, the client device being configured to:
            store a data structure defining parameters of the trained singular machine learning model;
            retrieve input data for the trained singular machine learning model;
            apply the trained singular machine learning model to the input data to generate results; and
            display the results.

2. The system of claim 1, wherein the models comprise at least one neural network.

3. The system of claim 1, wherein the models comprise at least one linear regression.

4. The system of claim 1, wherein the operations further comprise:
    determining whether the models comprise a same model type;
    when the models are determined to comprise the same model type, selecting the same model type for the singular machine learning model; and
    when the models are determined to comprise different model types, selecting a neural network type for the singular machine learning model.

5. The system of claim 1, wherein the singular machine learning model comprises a neural network that overfits the clustered models.

6. The system of claim 5, wherein:
    the singular machine learning model comprises a plurality of layers; and
    a number of the singular machine learning model layers is at least as great as a number of layers in a first one of the models having a largest number of layers.

7. The system of claim 6, wherein each layer of the singular machine learning model comprises a plurality of nodes, the number of the singular machine learning model nodes being at least as great as the number of nodes in corresponding layers in one of the models having a largest number of nodes.

8. The system of claim 1, wherein mapping the outputs to features of the models comprises applying one or more weights to the outputs during mapping.

9. The system of claim 8, wherein the one or more weights are equal to each other.

10. The system of claim 8, wherein the one or more weights comprise inputs from a user.

11. The system of claim 1, wherein outputting the trained singular machine learning model further comprises at least one of storing the trained singular machine learning model in the at least one storage medium.

12. A system for generating a singular ensemble model, comprising:
    a model generator configured to:
        obtain information from at least one of a database, a client device, or an input recognizer; and
        generate a plurality of machine learning models based on the obtained information and consistent with a requested prediction included in the obtained, the models having a plurality of layers, a plurality of nodes, and a model type, wherein the requested prediction predicts input of a user based on features extracted from partial inputs;
    a model clusterer configured to:
        obtain the models from the model generator; and
        automatically generate clusters of the models, the clusters comprising a plurality of the models having at least one of a similar input type or similar output type;
    at least one processor; and
    at least one storage medium storing instructions that, when executed, configure the processor to perform operations comprising:
        obtaining, from the model clusterer, a plurality of the clustered models;

obtaining a plurality of training data sets consistent with the plurality of clustered models from at least one of the database, the client device, or the input recognizer, each set corresponding to one of the models;

applying the clustered models to the corresponding training data sets to obtain output sets associated with the models, each output set corresponding to one of the clustered models, combining the output sets to form a final output set, mapping the final output set to features of the clustered models;

combining the mapped features of the models into a singular machine learning model;

training the singular machine learning model using the corresponding training data sets; and outputting the trained singular machine learning model, the outputting comprising transmitting the trained singular machine learning model to a client device, the client device being configured to:
store a data structure defining parameters of the trained singular machine learning model;
retrieve input data for the trained singular machine learning model;
apply the trained singular machine learning model to the input data to generate results; and
display the results.

13. The system of claim 12, wherein combining the output sets to form a final output set comprises applying one or more weights to the outputs during mapping.

14. The system of claim 13, wherein the one or more weights are equal to each other.

15. The system of claim 13, wherein the one or more weights comprise inputs from a user.

16. The system of claim 12, wherein the mapped features of the models comprise feature vectors extracted from the training data sets.

17. The system of claim 12, wherein the operations further comprise training the singular machine learning model using at least one new training data set.

18. The system of claim 12, wherein training the singular machine learning model comprises recursive adjustments of one or more parameters of the singular machine learning model.

19. The system of claim 18, wherein the recursive adjustments are configured to reduce at least one of root-mean-square deviation (RMSD), Akaike information criterion (AIC), or logarithmic loss (LOGLOSS).

20. A system for generating a singular ensemble model, comprising:
an input recognizer configured to:
receive a request for a model from a client device;
provide, based on the request, an indication to a model generator to generate a model; and
cluster data to create a training data set;
a model generator configured to:
obtain information from the input recognizer; and
generate a plurality of machine learning models based on the obtained information, the models having a plurality of layers, a plurality of nodes, and a model type;
a model clusterer configured to:
obtain the models from the model generator; and
automatically generate clusters of the models, the clusters comprising a plurality of the models having at least one of a similar input type or similar output type;
at least one processor; and
at least one storage medium storing instructions that, when executed, configure the processor to perform operations comprising:
obtaining, from the model clusterer, a plurality of the clustered models;
obtaining, from the input recognizer, the training data set, the training data set being consistent with the plurality of clustered models;
applying the plurality of clustered models to the training data set to obtain outputs associated with the models;
mapping the outputs to features of the models;
combining the mapped features of the models into a singular machine learning model;
applying the singular machine learning model to the training data set to obtain output;
comparing the outputs to the output of the singular machine learning model;
adjusting one or more parameters of the singular machine learning model based on the comparison;
determining whether the comparing and the adjusting comply with at least one threshold, wherein the threshold comprises at least one of a direct threshold or a threshold relative to a last iteration of parameter adjustment; and
outputting the trained singular machine learning model to the client device, the client device being configured to:
store a data structure defining parameters of the trained singular machine learning model;
retrieve input data for the trained singular machine learning model;
apply the trained singular machine learning model to the input data to generate results; and
display the results.

* * * * *